Oct. 30, 1951  G. I. DANLY ET AL  2,573,549
CONNECTING ROD JOINT
Original Filed Nov. 3, 1947
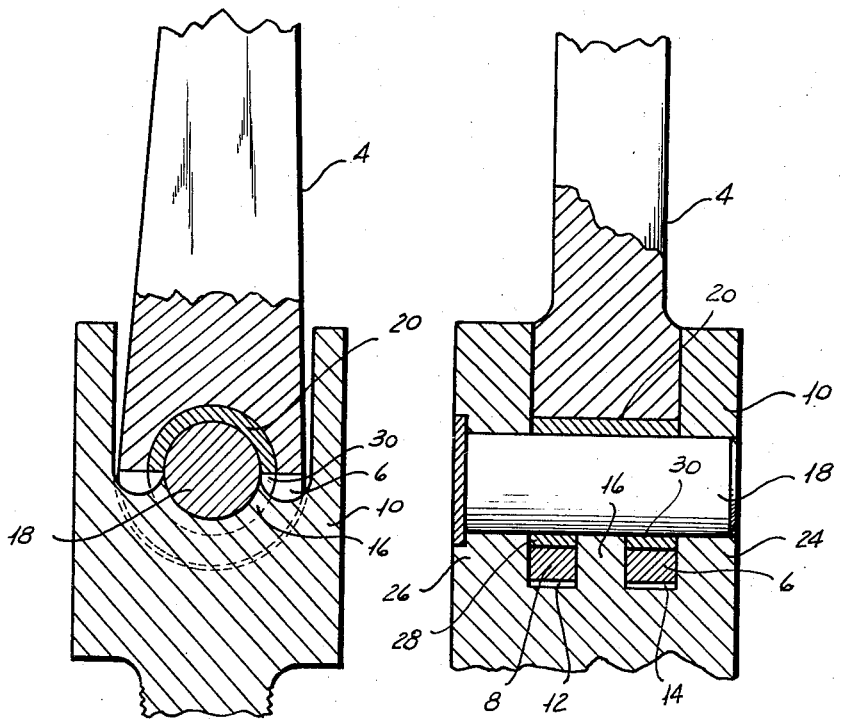
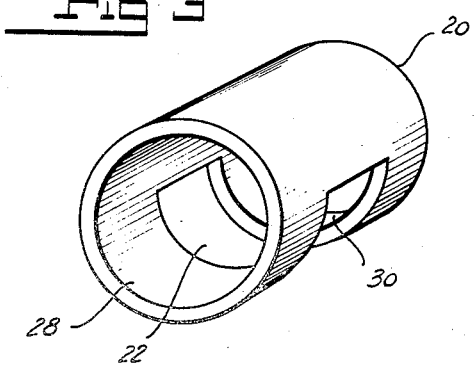
INVENTOR.
GEORGE I. DANLY
BY VASIL GEORGEFF
ATTORNEY Patented Oct. 30, 1951

2,573,549

UNITED STATES PATENT OFFICE 2,573,549

CONNECTING ROD JOINT

George I. Danly, Elmhurst, and Vasil Georgeff, Chicago, Ill., assignors to Danly Machine Specialties, Inc., Chicago, Ill., a corporation of Illinois Original application November 3, 1947, Serial No. 783,749. Divided and this application July 21, 1949, Serial No. 106,066

2 Claims. (Cl. 287—96).

Our invention relates to connecting rod joints, and more particularly to an improved joint between the pitman and ram of a power press.

This application is a division of our copending application Serial No. 783,749 for an adjustable press ram, filed November 3, 1947, now Patent No. 2,511,978.

In power presses large forces are present and the entire thrust must be transmitted to the ram through its joint to the pitman. So great are the forces involved, especially at times when the press is inadvertently overloaded, that failures have occurred. It has been the practice in the prior art to provide a knee joint to avoid bent or broken wrist pins. The construction of a knee joint at the lower end of a pitman involves a difficult and expensive machining operation. The external surface of the lower end of the pitman must be finish-machined and inasmuch as pitmans of power presses are frequently heavy and large pieces, not only is the machining difficult but it requires expensive equipment. Then too the external surface must be machined concentric with the internal bearing surface through which the wrist pin passes, adding to the difficulty and expense of the construction.

One object of our invention is to provide an improved connecting rod joint between the pitman and a reciprocating part of a power press which will transmit the thrust of the press through a wrist pin in a manner to avoid the bending or breaking of wrist pins.

Another object of our invention is to provide a strong and simple connecting rod joint with the use of a wrist pin and avoiding the expensive knee joint which is commonly used in the prior art.

Other and further objects of our invention will appear from the following description.

In the accompanying drawings which form part of the instant specification and which are to be read in conjunction therewith, and in which like reference numerals are used to indicate like parts in the various views:

Figure 1 is a side elevation of our improved rod joint with parts in section.

Figure 2 is a front elevation of our improved rod joint with parts in section.

Figure 3 is a perspective view showing the bearing bushing used in our joint.

In general our improved joint employs a wrist pin which coacts with a bifurcated pitman end, thus enabling us to support the wrist pin not only adjacent its ends but also intermediate thereof. A bronze bearing bushing having the central portion removed to accommodate the intermediate pin bearing is provided. The thrust of the press is transmitted through the pin and bushing with the pin being supported during its heavy loading in such a manner as to preclude the danger of bending or deflecting the pin.

More particularly referring now to the drawings, a pitman 4 is formed with its lower end bifurcated to provide a pair of segments 6 and 8. The member 10 which is adapted to reciprocate, forms part of an adjustable connection between the pitman and the ram, which connection is the subject of our copending application Serial No. 783,749. It is to be understood that the member 10 to which the pitman 4 is connected may be any suitable reciprocating member. The member 10 is formed with a pair of recesses 12 and 14, there being an intermediate bridge portion 16. The member 10 and the lower end of the pitman 4 are provided with openings through which the wrist pin 18 passes. A bearing bushing 20 is positioned around the wrist pin 18 and contacts the inner or working surface of the opening formed at the lower end of the pitman 4. The bushing 20 which can be seen in Figure 3 is provided with a segmental opening 22 through which the bridge 16 of the member 10 passes. The upper end of the bridge 16 is machined to a working surface and is adapted to bear against the wrist pin 18 and support it intermediate its ends. The pin may be of hardened steel and ground to have an external diameter adapted to fit the internal diameter of the bushing 20 which may be made of bronze. As will readily be seen by reference to Figure 2, the downward thrust of the pitman 4 is transmitted by the upper portion of the bushing 20 to the wrist pin 18 and is transmitted through the wrist pin to the member 10. Since the wrist pin is supported adjacent its right end by the portion 24 of the member 10, at its left hand end by the portion 26 of the member 10, and intermediate its ends by the bridge 16, the thrust will be readily transmitted through the wrist pin with no danger of its deflection. During the working stroke of the press the thrust is transmitted through a well supported wrist pin. Separated sections 28 and 30 of the bushing coacting with the segments 6 and 8 of the pitman transmits the upward force to the wrist pin, which during its upward motion is supported only adjacent its ends. The forces involved in the upward motion, however, are of small order compared with those existing during the working stroke of the press, so that during this motion the support of the wrist pin at two points only is ample.

It will be seen that we have accomplished the objects of our invention. We have provided an improved rod joint so that the thrust is amply supported during the working stroke by the provision of an increased bearing surface. Through the use of our improved joint we have obviated the necessity of using an expensive knee joint which is so difficult to construct. We have eliminated further the necessity of two concentric finish-machined surfaces which advantage alone makes our construction more economical than that of the prior art using knee joints.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a power press, a pitman and a reciprocating member, said pitman being formed with a bifurcated lower end, said reciprocating member being formed with recesses adapted to receive the branches of said bifurcated end, and a pin pivotally connecting said bifurcated end to said reciprocating member, the lower portion of said pin being supported by said reciprocating member adjacent its ends and intermediate thereof.

2. In a power press, a pitman and a reciprocating member, said pitman being formed with a bifurcated lower end, said reciprocating member being formed with recesses adapted to receive the branches of said bifurcated end, and a pin pivotally connecting said bifurcated end to said reciprocating member, the lower portion of said pin being supported by said reciprocating member adjacent its ends and intermediate thereof, a bearing bushing surrounding said pin, said bushing having a segment thereof removed to permit the intermediate bearing portion of said reciprocating member to make contact with said pin.

GEORGE I. DANLY.
VASIL GEORGEFF.

REFERENCES CITED

The following references are of record in the file of this patent:

UNITED STATES PATENTS

| Number | Name | Date |
| --- | --- | --- |
| 2,318,954 | Miller et al. | May 11, 1943 |